Feb. 15, 1955 — A. O. KELLY — 2,702,095
BALED HAY HOIST
Filed Oct. 2, 1952 — 3 Sheets-Sheet 1

Augustus O. Kelly
INVENTOR.

Feb. 15, 1955

A. O. KELLY 2,702,095

BALED HAY HOIST

Filed Oct. 2, 1952

Augustus O. Kelly
INVENTOR.

Feb. 15, 1955  A. O. KELLY  2,702,095
BALED HAY HOIST
Filed Oct. 2, 1952  3 Sheets-Sheet 3
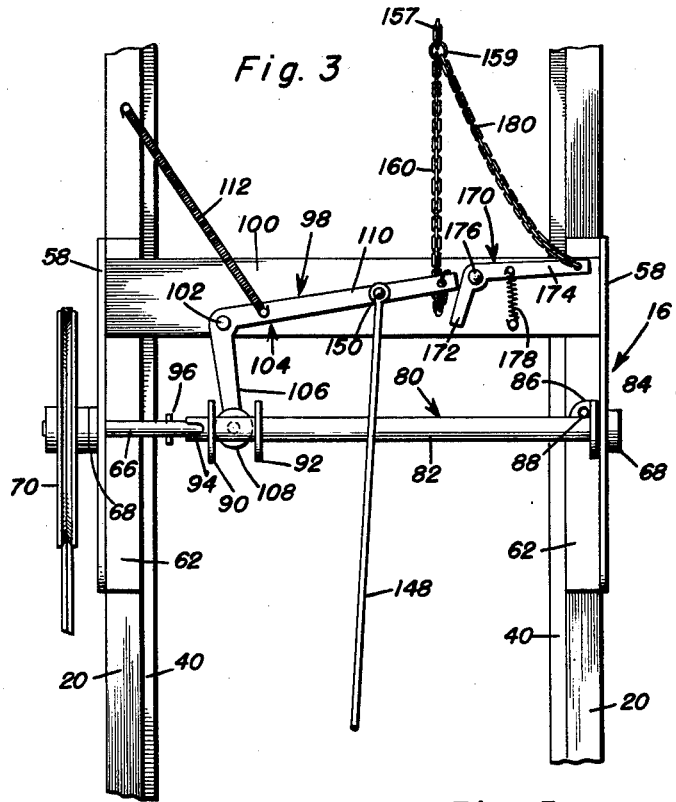
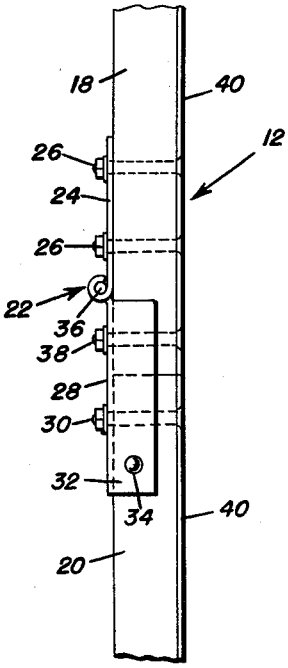
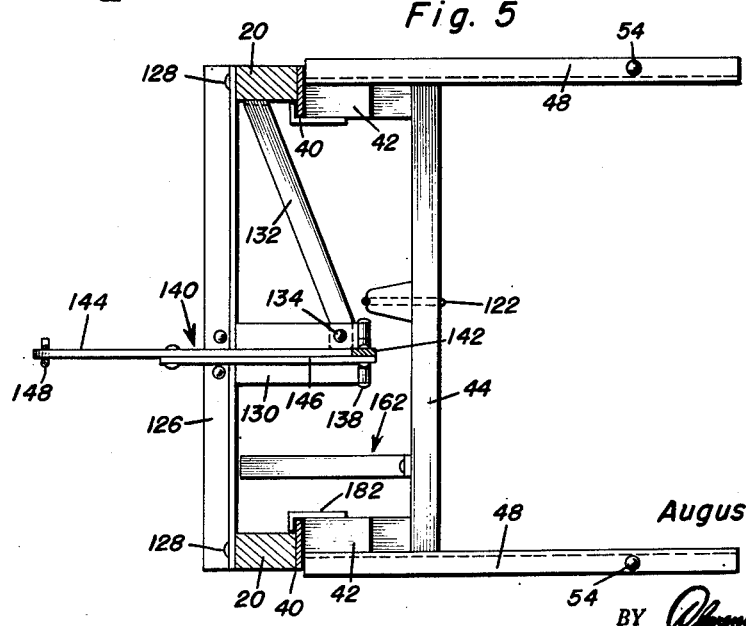
Augustus O. Kelly
INVENTOR.

United States Patent Office 2,702,095
Patented Feb. 15, 1955

2,702,095
BALED HAY HOIST
Augustus O. Kelly, Bryant, Ind.

Application October 2, 1952, Serial No. 312,793

4 Claims. (Cl. 187—10)

This invention relates in general to hoist means, and more particularly to a hoist for raising baled hay to an upper level of a barn or a similar storage place.

The primary object of this invention is to provide an improved bale hoist which may be conveniently positioned within a barn or other storage place for mechanically raising bales of hay and the like to an upper level thereof.

Another object of this invention is to provide an improved bale hoist whose operation is automatic, said bale hoist including a carriage which is immediately moved to an elevated position upon the positioning of a bale thereon, said hoist being adapted to automatically dump a bale at the upper end of its travel and permit return of the carriage to its initial bale receiving position.

Another object of this invention is to provide an improved drive means for a carriage of a bale hoist, said drive means including a drive shaft having associated therewith a drum for a hoist line, said drum being selectively engaged with said drive shaft by clutch means, said clutch means being actuated by the relative position of a bale and its associated carriage.

Another object of this invention is to provide an improved bale hoist for raising bales of hay and the like to elevated positions in storage areas such as barns, said bale hoist being of a relatively simple construction and formed of readily attainable materials whereby the same is economically feasible.

Another object of this invention is to provide an improved bale hoist which includes an elongated trackway having a carriage movable therealong for raising bales of hay and the like to elevated positions, said trackway being foldable to facilitate storage and transportation of the bale hoist.

A further object of this invention is to provide an improved bale hoist which is automatic in operation and which requires no attention other than the placing of bales thereon and the positioning of bales deposited thereby at an upper level.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application and in which:

Figure 3 is a fragmentary rear elevational view on a large scale of the clutch and drive means of the bale hoist of Figure 1 and shows the relationship of the raised elements thereof, a hoist line being omitted for purposes of clarity;

Figure 4 is an enlarged fragmentary side elevational view of an intermediate portion of the trackway of the bale hoist and shows the manner in which the same may be folded for facilitating storage and the transportation of the same;

Figure 5 is a transverse sectional view taken substantially upon the plane indicated by the section line 5—5 of Figure 2 and shows the general construction of the carriage and its relationship to the trackway;

Figure 1:
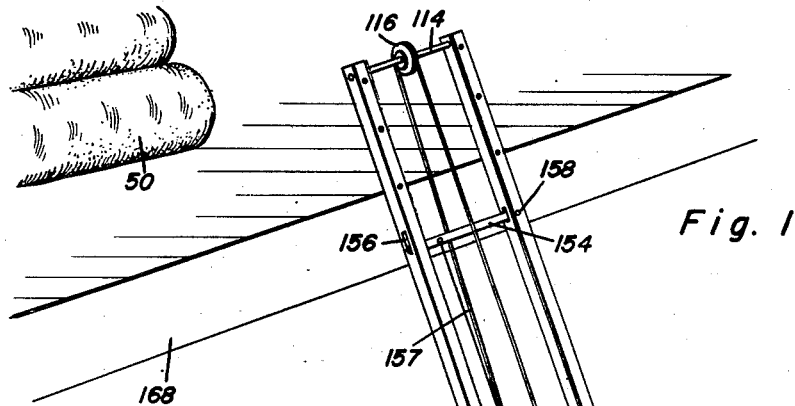
Figure 1 is a perspective view of the bale hoist, which is the subject of this invention, and shows the same in position for elevating bales of hay and the like from a ground level to an upper level within a storage building.
Figure 6:
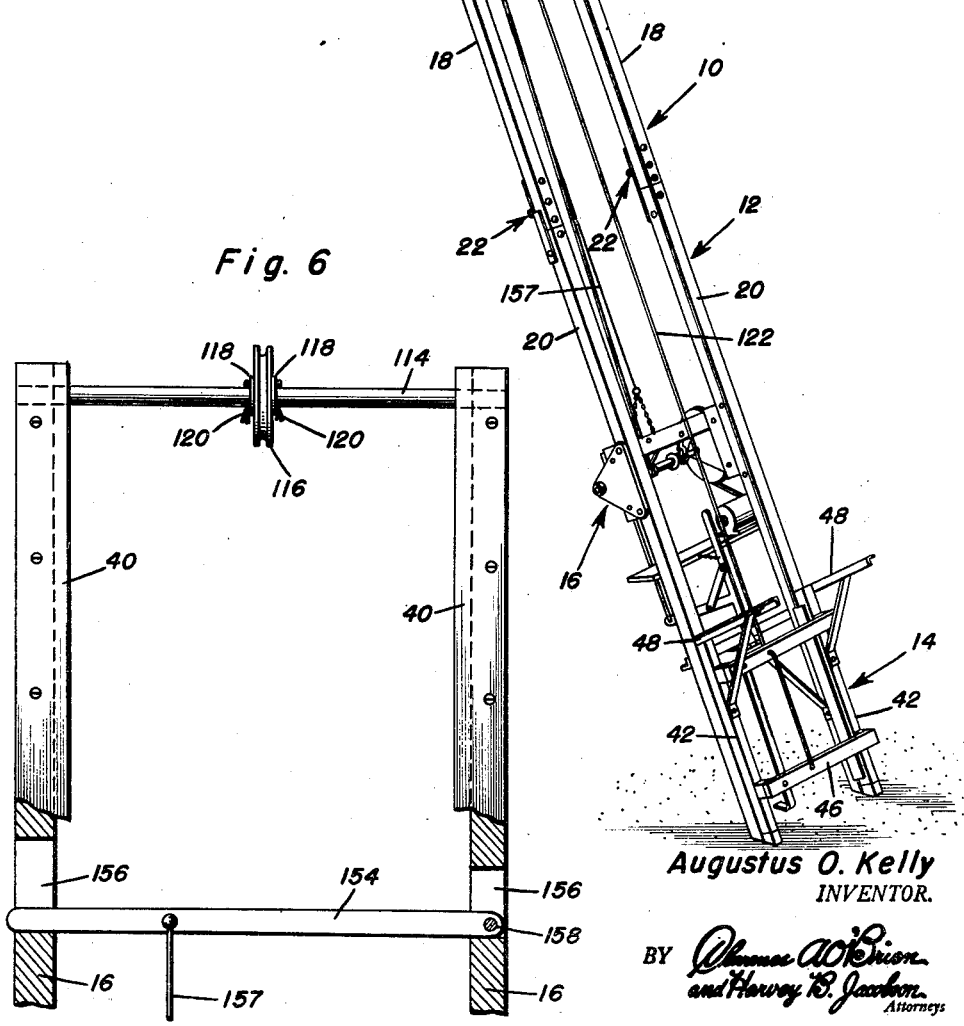
Figure 7:
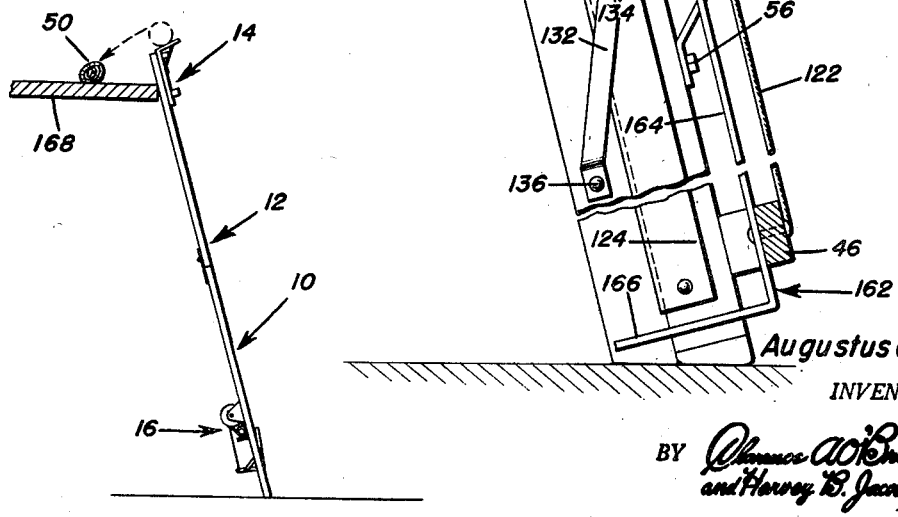

Figure 6 is an enlarged elevational view of the upper end of the trackway and shows the mounting of an idler pulley thereon, a portion of the trackway being broken away and shown in section in order to clearly illustrate the mounting of a transverse bar which forms a portion of linkage for actuating clutch disengaging means; and Figure 7 is a side elevational view of the bale hoist of Figure 1 on a reduced scale and shows the manner in which a bale of hay or the like is automatically dispensed from the carriage when the same reaches the upper end of its travel.

Similar characters of reference designate similar or identical elements and portions throughout the specification and throughout the different views of the drawings.

Referring now to the drawings in detail, it will be seen that the bale hoist, which is the subject of this invention, is referred to in general by the reference numeral 10. The bale hoist 10 includes an elongated trackway which is referred to in general by the reference numeral 12, the trackway having mounted thereon for substantially vertical movement a carriage which is referred to in general by the reference numeral 14. The carriage 14 is adapted to have positioned thereon a bale of hay or the like and is intended for elevating the same to an upper level in a storage building such as a barn or the like. The carriage 14 is moved along the trackway 12 by drive means, which is referred to in general by the reference numeral 16, carried by the trackway 12.

The trackway 12 includes a pair of spaced parallel legs each of which is divided into upper and lower sections 18 and 20, respectively. As is best illustrated in Figure 4, the upper and lower sections of each leg are secured together by a hinge which is referred to in general by the reference numeral 22. The hinge 22 includes an upper hinge strap 24 which underlies the lower end of the upper section and is secured thereto by suitable fasteners 26 which pass through the upper section 18 from the front to the rear thereof. The hinge 22 includes a lower hinge strap 28 which has a portion thereof underlying the rear of the upper end of the lower section 20 and which has the lower portion thereof secured to the upper end of the lower section 20 by a fastener 30 which is in spaced parallel relation to the fasteners 26. The hinge strap 28 also includes an offset flange portion 32 which is positioned adjacent the side of the upper end of the lower section 20 and which is secured thereto by a transversely extending fastener 34.

It will be noted that the hinge straps 24 and 28 are secured together by a hinge pin 36. The lower end of the upper section 18 extends downwardly beyond the hinge pin 36 and abuts the hinge strap 28 when the sections 18 and 20 are in alignment. The relationship of the upper section 18 to the hinge strap 28 is such that the sections 18 and 20 may be folded in one direction only. When it is desired to utilize the trackway 12, the sections 18 and 20 of each leg are moved into alignment, as is illustrated in Figure 4, then an additional fastener 38 is passed through the lower end of the upper section 18 and the hinge strap 28 to rigidly secure the sections 18 and 20 together.

It will be noted that the fasteners utilized in connecting the hinge 22 to the sections 18 and 20 also secure ends of flat plates 40 in overlying relation with respect to the front surface of the legs. The flat plates 40 are intended to be engaged by the carriage 14 and facilitate sliding of the same with respect to the trackway 12.

Figure 2:
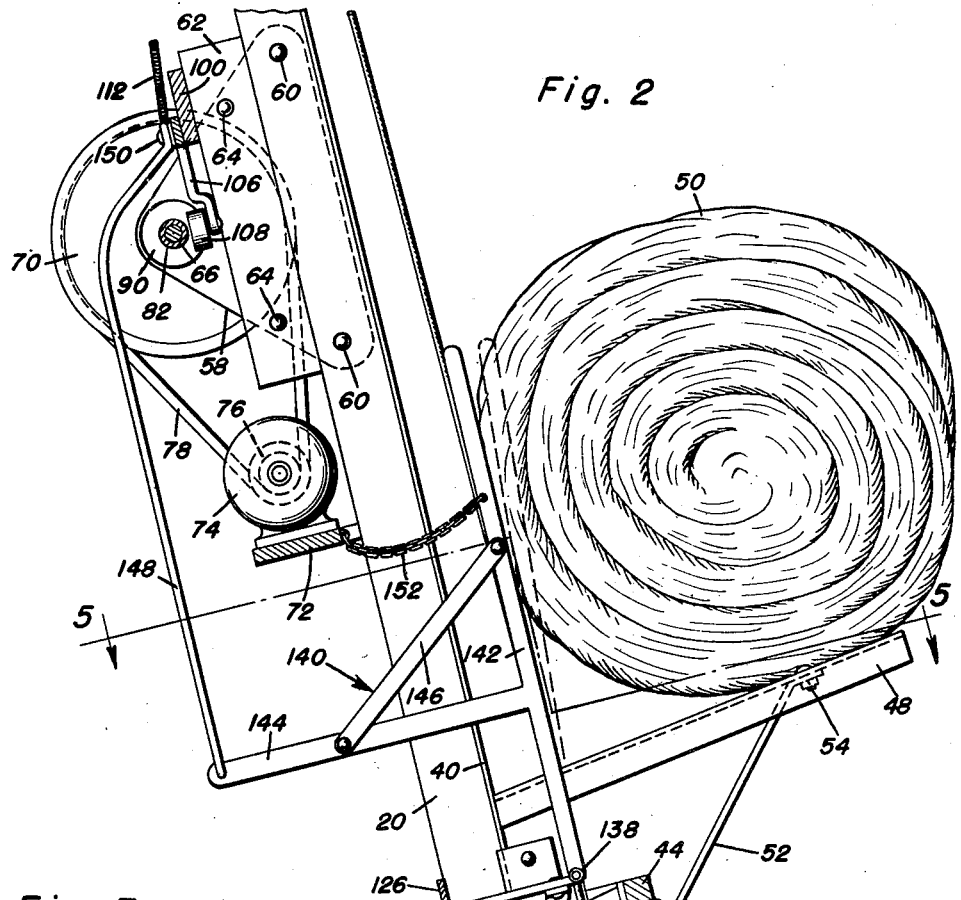
Figure 2 is an enlarged fragmentary vertical sectional view taken substantially through the center of the lower portion of the bale hoist of Figure 1 and shows the general arrangement of the carriage with respect to the trackway, a bale of hay being mounted on the carriage, the drive means for raising the carriage, and lower control means for the same.

Referring now to Figures 1, 2 and 5 in particular, it will be seen that the carriage 14 includes a pair of longitudinally extending frame members 42 which are spaced substantially the same distance as are the plates 40 and which are in overlying engagement with the same. The longitudinal frame rails 42 are connected together adjacent their upper and lower ends by overlying transversely extending frame members 44 and 46, respectively.

Secured to the side faces of the upper ends of the longitudinal frame members 42 are outwardly projecting angle members 48. The angle members 48 are in spaced parallel relation and are adapted to have supported thereon a bale of hay or the like, the bale of hay being referred to by the reference numeral 50. In order that the angle members 48 may support the weight of the bale of hay 50, they are braced by downwardly and rearwardly extending diagonal braces 52 which are secured to the angle members 48 adjacent their outer ends by suitable fasteners 54 and to the longitudinal frame members 42 intermediate their ends by suitable fasteners 56.

Referring now to Figures 2 and 3, in particular, it will be seen that the drive means 16 includes a pair of generally triangular gusset plates 58 which are secured along their bases to outer sides of the lower sections 20 intermediate their ends by suitable fasteners 60. The triangular gussets 58 extend rearwardly from the lower section 20 and have secured thereto in overlying relation with respect to the rear of the lower sections 20 longitudinally extending support members 62. The support members 62 are rigidly secured to the gussets 58 in spaced parallel relation by suitable fastener 64.

Extending between rear apexes of the gusset plates 58 and suitably journaled therein is a drive shaft 66. The drive shaft 66 is retained in position by collars 68 which engage outer faces of the gussets 58, the collars 68 being carried by the drive shaft. The drive shaft 66 also extends outwardly beyond one of its collars 68 and has mounted thereon a driven pulley 70.

Referring now to Figure 2 in particular, it will be seen that extending between and secured to the rear edges of the lower section 20 is a transverse support member 72. Mounted on the transverse support member 72 is a suitable motor 74 which includes a drive pulley 76. The drive pulley 76 is in alignment with the driven pulley 70 and is connected thereto for driving the same by a drive belt 78 entrained over the two pulleys.

Referring once again to Figure 3 in particular it will be seen that mounted on the drive shaft 66 for sliding movement longitudinally thereof is an elongated drum which is referred to in general by the reference numeral 80. The drum includes a tubular rope receiving portion 82 which has secured to one end thereof an annular flange 84. The annular flange 84 is positioned adjacent the right triangular gusset 58, as viewed in Figure 3, and has secured thereto an ear 86. The ear 86 has formed therein an aperture 88 for receiving one end of a hoist rope, the hoist rope not being illustrated in Figure 3.

Secured to the sleeve 82 adjacent the opposite end thereof is a pair of spaced parallel annular flanges 90 and 92, the flange 92 being positioned adjacent the annular flange 84 and forming one end of the rope receiving portion of the sleeve 82. The extreme end of the sleeve 82, which terminates short of the other of the triangular gussets 58 is provided with a pair of longitudinally extending notches 94, the notches 94 being diametrically opposite from each other and having receivable therein a transverse pin 96 carried by the drive shaft 66.

It will be seen that the notches 94 and the pin 96 form clutch means for selectively engaging and disengaging the drum 80 with the drive shaft 66. In order that the clutch means may be suitably actuated, there is provided clutch actuating means which are referred to in general by the reference numeral 98.

The clutch actuating means 98 includes a transverse support member 100 which extends between the upper ends of the support members 62 and is rigidly secured to the rear faces thereof. Pivotally connected to the transverse support member 100 through the use of a pivot pin 102 is an angle portion of a bell crank 104. The bell crank 104 includes a vertical arm 106 which has mounted on the lower end thereof for rotation a suitable wheel 108. The wheel 108 is of a size to be received between and engage the annular flanges 92 and 90. When the vertical leg 106 is moved to the left, as viewed in Figure 3, it engages the annular flange 90 and moves the drum 80 to the left to permit engagement of the pin 96 within the notches 94. When the vertical leg 106 is moved to the right, the wheel 108 engages the annular flange 92 and moves the drum 80 away from the pin 96 to effect disengagement thereof from the same.

The bell crank 104 also includes a horizontal leg 110. The horizontal leg 110 has connected thereto a spring 112 whose other end is connected to one of the lower sections 20. The spring 112 urges the horizontal leg 110 upwardly with the resultant movement of the vertical leg to the right, as viewed in Figure 3, to retain the drum 80 disengaged from the drive shaft 66.

Referring now to Figure 6 in particular, it will be seen that extending transversely of the upper ends of the upper sections 18 is a rigid shaft 114. Mounted on the shaft 114 for rotation with respect to the same is an idler pulley 116. The idler pulley 116 is retained in a central position on the shaft 114 by a pair of collars 118 which are positioned by suitable fasteners 120.

Secured to the ear 86 on the drum 80 and partially reeled thereon is one end of a hoist line 122. The hoist line 122 extends upwardly at the rear of the trackway 12, over the idler pulley 116 and down in front of the trackway 12. As is best illustrated in Figure 2, the lower end of the hoist line 122 passes through an aperture in the upper transverse frame member 44 from rear to front, and downwardly to the lower transverse frame member 46 of the carriage 14. The hoist line 122 then passes through an aperture in the lower transverse frame member 46 from front to rear and is secured therein by a knot 124 at the terminal end of the hoist line 122.

Inasmuch as the hoist line 122 passes over the idler pulley 116 at the upper end of the trackway 12, it will be seen that when the motor 74 is running and the drum 80 is engaged with the drive shaft 66, the hoist line 122 will be reeled thereon and pulled upwardly over the idler pulley 116. Upwardly movement of the hoist line 122 will result in a like upward movement of the carriage 14 which will have a bale of hay 50 mounted thereon.

Referring now to Figures 2 and 5 in particular, it will be seen that extending between the lower sections 20 adjacent the lower end thereof is a transverse angle member 126. The transverse angle member 126 is secured to the rear edges of the lower sections 20 by suitable fasteners 128. Rigidly secured to the transverse angle member 126 and extending forwardly therefrom between the lower sections 20 is a hinge strap 130. The hinge strap 130 has the forward end thereof braced by a diagonal brace which extends upwardly and inwardly from an inner face of one of the lower sections 20. The diagonal brace is referred to by the reference numeral 132 and is secured to the hinge strap 130 and at its respective lower section by suitable fasteners 134 and 136, respectively.

Hingedly connected to the forward end of the hinge strap 130 by a hinge pin 138 is the lower end of a clutch engaging lever which is referred to in general by the reference numeral 140. The clutch engaging lever 140 includes a vertical leg 142 whose lower end is secured to the hinge strap 130. Connected to the vertical leg 142 intermediate its ends is a rearwardly extending horizontal leg 144. The horizontal leg 144 is braced with respect to the vertical leg 142 by an upwardly and forwardly extending diagonal brace 146.

Carried by the rear end of the horizontal leg 144 and extending upwardly is an actuating rod 148. The actuating rod 148 is generally L-shaped and has the upper end thereof connected to the horizontal leg 110 of the bell crank 104 intermediate the end thereof by a suitable fastener 150. As is best illustrated in Figure 2, when the bale of hay 50 is placed on the carriage 14, it engages the upper portion of the vertical leg 142 and results in the downward pivoting of the horizontal leg 144. The downward movement of the rear end of the horizontal leg 144 results in the downward movement of the actuating rod 148 and the accompanying pivoting of the bell crank 104 to engage the clutch means which connects the drum 80 to the drive shaft 66. Therefore, it will be seen that immediately upon placing the bale of hay 50 on the carriage 14, the carriage 14 will be moved upwardly along the trackway 12 by the drive means 16.

In order that outward movement of the vertical leg 142 may be limited upon return of the clutch engaging lever 40 to its normal position due to the action of the spring 112, there is provided a flexible member 152. The flexible member 152 extends between the vertical leg 142 and the transverse support member 72.

Referring now to Figures 3 and 6 in particular, it will be seen that carried by the upper sections 16 adjacent the upper ends thereof is a transverse bar 154. The ends of the transverse bar are mounted within elongated vertical openings 156 in the upper sections 16 and one end thereof is pivotally mounted within its associated opening 156 by a pivot pin 158. The other end of the transverse bar 154 is free to move vertically within its associated opening 156.

Secured to the transverse bar 154 adjacent its freely moving end is an upper end of a flexible link 156, whose lower end is connected to a ring 158. Extending downwardly from the ring 158 is a second flexible link 160 whose lower end is connected to the horizontal leg 110 of the bell crank 104. It will be seen that when the flexible link 160 moves upwardly the bell crank 104 will be pivoted so as to move the drum 80 out of engagement with the pin 96 of the drive shaft 66.

Referring now to Figure 2 in particular, it will be seen that there is illustrated an L-shaped lever which is referred to in general by the reference numeral 162. The L-shaped lever 162 is carried by the carriage 14 and includes a vertical leg 164 which is secured to the rear of the transverse frame members 44 and 46. The L-shaped lever 162 also includes a rearwardly extending leg 166 which is adapted to engage the transverse bar 184 and pivot the same upwardly. It will be understood that the L-shaped lever 162 is offset from the center of the carriage 14 so as to avoid engagement of the same with the clutch engaging lever 140 and elements thereof.

Referring now to Figure 7 in particular, it will be seen that when the carriage 14 reaches the upper end of its travel the bale of hay 50 carried thereby will be disposed above the trackway 12. Inasmuch as the trackway 12 retains the bale of hay 50 on the carriage 14, it will be seen that it will be immediately dropped onto the upper surface of an upper level 168 of a barn or other storage building in which the bale hoist 10 is positioned. It will be understood that the trackway 12 of the bale hoist 10 has its upper end supported by an edge of the upper level 168 and passes slightly upwardly thereabove.

In operation, when the carriage 14 reaches substantially its uppermost position, the rearwardly extending leg 166 of the L-shaped lever 162 engages the horizontal bar 154. The pivoting of the horizontal bar 154 results in the disengagement of the drum 80 with respect to the drive shaft 66 and permits the carriage 14 to return to its initial bale receiving position due to its own weight. It will be understood that the pivoting of the horizontal bar 154 is so timed that the bale of hay 50 rolls off of the carriage 14 prior to its descent.

Referring now to Figure 3 in particular, it will be seen that there is illustrated a brake, which is referred to in general by the reference numeral 170, for retaining the bell crank 104 in a clutch engaging position. The brake 170 is in the form of a bell crank and includes a vertical leg 172 and a horizontal leg 174. The brake 170 is pivotally secured at its point of juncture between the legs by a pivot pin 176, the pivot pin 176 being carried by the transverse support member 100.

It will be seen that when the horizontal leg 110 of the bell crank 104 is moved downwardly by the actuating rod 148 the free end thereof engages the vertical leg 172 of the brake 170 and is jammed thereby. The jamming action is caused by a spring 178 which extends between the horizontal leg 174 and the transverse support member 100 to urge the vertical leg 172 outwardly against the end of the horizontal leg 110.

It will be readily apparent that prior to the movement of the bell crank 104 to a clutch disengaging position by the flexible member 160, the brake 170 should be disengaged. In order to accomplish this, depending from the ring 150 and secured thereto is a third flexible link 180. The lower end of the third flexible link 180 is connected to the other end of the horizontal leg 174 of the brake 170 and is adapted to move the same to a disengaged position. Inasmuch as the flexible link 180 is shorter than the flexible link 160, it will be seen that the brake 170 is disengaged prior to the movement of the bell crank 104 to a clutch disengaging position by the flexible link 160.

Referring now to Figure 5 in particular, it will be seen that although the carriage 14 would be urged upwardly in alignment with the trackway 12 due to the aligned pull of the hoist line 122, that the same is provided with suitable guide means to prevent disengagement of the same from the trackway 12. The guide means is in the form of a pair of angle members 182 which extend longitudinally of the longitudinal frame members 142 and have flanges engaged beneath the plates 40. Inasmuch as the plates 40 have edge portions thereof positioned between the flanges of the angle members 182 and the longitudinal frame members 42, movement of the carriage 14 with respect to the trackway 12 is limited to longitudinal movement.

It will be understood that while the bale hoist has been illustrated and described solely with respect to the hoisting of bales of hay, the bale hoist may be utilized for raising numerous objects to elevated positions and in no way limited to farm use.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. A bale hoist comprising a trackway, a carriage mounted for movement along said trackway, drive means for moving said carriage, controls for said drive means responsive to a location of a bale when mounted on said carriage, said drive means including a clutch, said controls including a clutch engaging lever actuated by initially positioning a bale on said carriage, a clutch disengaging lever, said clutch disengaging lever being actuated by linkage engageable by said carriage when in an uppermost bale dumping position, a brake for retaining said clutch engaging lever in a clutch engaging position, said brake being automatically released by said linkage upon engagement thereof with said carriage.

2. The bale hoist of claim 1 wherein said brake is in the form of a L-shaped member pivotally mounted at its apex, one leg of said L-shaped member being adapted to overlie a free end of said clutch disengaging lever, a second leg of said L-shaped member being connected to said linkage for movement thereby.

3. The bale hoist of claim 1 wherein said brake is in the form of a L-shaped member pivotally mounted at its apex, one leg of said L-shaped member being adapted to overlie a free end of said clutch disengaging lever, a second leg of said L-shaped member being connected to said linkage for movement thereby, that portion of said linkage connected to said brake being shorter than the portion of said linkage connected to said clutch disengaging lever whereby said brake is moved to a disengaged position in advance of movement of said clutch disengaging member.

4. The bale hoist of claim 1 wherein that portion of said linkage connected to said brake being shorter than the portion of said linkage connected to said clutch disengaging lever whereby said brake is moved to a disengaged position in advance of movement of said clutch disengaging member.

References Cited in the file of this patent

UNITED STATES PATENTS

| Number | Name | Date |
|---|---|---|
| 1,180,700 | Dain | Apr. 25, 1916 |
| 1,250,478 | McKenzie | Dec. 18, 1917 |
| 1,321,780 | Anderson | Nov. 11, 1919 |
| 1,432,513 | Zesbaugh et al. | Oct. 17, 1922 |
| 1,504,034 | Erwin | Aug. 5, 1924 |
| 1,541,529 | Saylor | June 9, 1925 |
| 1,956,650 | Milner | May 1, 1934 |
| 1,978,226 | Rear | Oct. 23, 1934 |
| 2,411,286 | Mitchell et al. | Nov. 19, 1946 |
| 2,482,211 | Reichardt | Sept. 20, 1949 |